Jan. 9, 1951           C. H. ANGELL           2,537,731

DEVICE FOR GAUGING MAGNETIC MATERIALS

Original Filed March 17, 1945

*INVENTOR.*
CHARLES H. ANGELL

BY *Kenneth Swartwood*

Patented Jan. 9, 1951

2,537,731

UNITED STATES PATENT OFFICE 2,537,731

DEVICE FOR GAUGING MAGNETIC MATERIALS

Charles H. Angell, Danville, Ill.

Original application March 17, 1945, Serial No. 583,341. Divided and this application March 7, 1950, Serial No. 148,189

3 Claims. (Cl. 175—183)

This application is a division of my application Serial Number 583.341 filed March 17, 1945, now Patent No. 2,503,721.

This invention relates to an apparatus for gauging magnetic materials and particularly for gauging the thickness of sheet material. A broad aspect of my invention comprises an improved apparatus for gauging the thickness of a magnetic material using the principle of the electromagnet wherein the flux resulting from variations in the width of the air gap due to variations in the thickness of the material gauged is used as a means to measure, indicate or control the thickness, which to my knowledge has never been done before. The gauging may be accomplished by either direct measurement, indirect measurement, gauging against a standard of thickness comparison, and other specific gauging procedures.

One object of my invention is to provide a novel apparatus for the continuous indication of the thickness of sheet material wherein the thickness of the material must be controlled within a definite tolerance range.

A more specific object of my invention is to provide a novel means in the electromagnetic gauging of magnetic material wherein vibrations in the supporting base and in the material being gauged do not affect the results of the gauging to a substantial extent.

Another specific object of my invention is to provide an apparatus in the gauging of magnetic materials for obtaining direct readings in dimensional terms for which no satisfactory apparatus has heretofore been provided.

A more specific object of my invention for gauging magnetic materials is to provide an improved apparatus for obtaining the zero or starting point from which variations of flux due to variations in width of the air gap are measured.

Another important aspect of my invention is to provide a gauging device employing electromagnetic principles having an inductance coil associated with each gauging magnet and positioning the inductance coils in a novel manner in an impedance bridge circuit to which is connected a source of alternating current and a current responsive means such that the sensitivity of the gauging device is increased. By sensitivity is meant the ratio of the amperes of current resulting from the flux flowing through the air gap to the width of the air gap. The air gap is the distance between the gauging magnets and the material being gauged. In my invention, the magnetic material being gauged acts as a gauging shunt or armature for the provision of the path for the lines of flux to travel. The greater the current flowing through the current responsive means for a given width of air gap or given thickness of material measured, the more sensitive and the more accurate is the gauging device.

A broad embodiment of my invention comprises the use of at least two opposing electromagnets spaced apart and positioned as to form an air gap between the poles of the two magnets with means for positioning the material to be gauged between the electromagnets in the air gap. By passing unidirectional lines of flux from the electromagnets to the material being gauged, a means is provided for indicating the thickness of the material independent of the exact position of the material in the air gap which is an extremely important feature of my invention since it is usually difficult, if not impossible, to accurately position the material to be gauged in the air gap or to avoid vibrations in the supporting base. In my invention such vibrations or accuracy in the positioning are immaterial since the current responsive means associated with the device measures the actual decrease in the air gap between the two electromagnets independent of such outside influences. The only thing that must be avoided is the actual touching of the material to be gauged by any of the poles of the electromagnets.

Another method and device I may use, although it is not to be considered equivalent, is the arranging of the two electromagnets as above described in a novel manner in an impedance bridge circuit, wherein the inductance coils associated with each of the magnets for the gauging device and associated with each of the magnets for a standard of thickness comparison device are arranged in parallel in the same arm of the bridge.

My invention will become more readily apparent by referring to the drawings in which Fig. 1 shows the means for positioning the two electromagnets with provision for the air gap and means for positioning the material to be gauged in the air gap. Fig. 1 is only illustrative and any other device within the teaching of my invention may be used.

Figure 1:
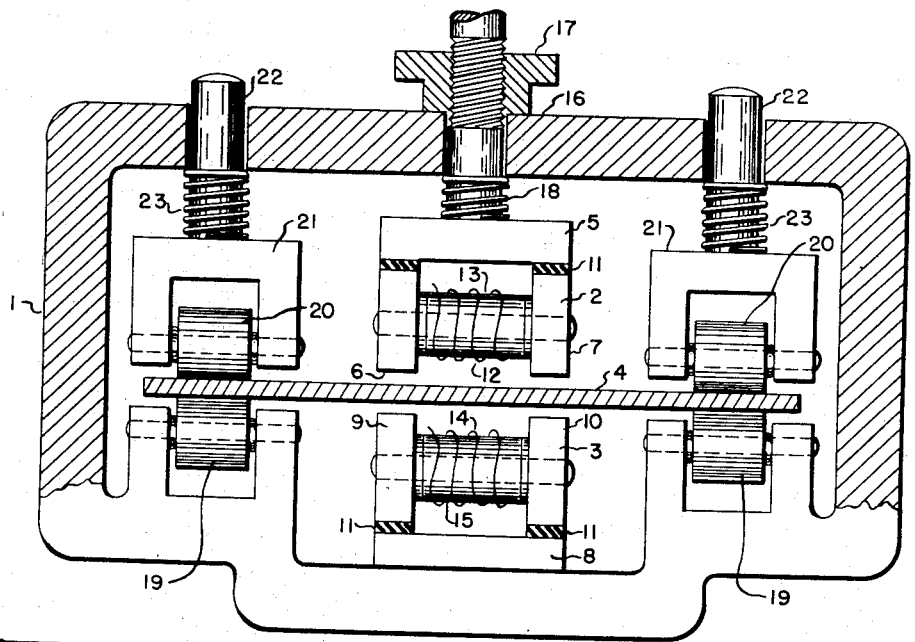

Referring to Fig. 1, a frame 1 for the electromagnets and for positioning the material to be gauged is provided. The frame may be attached to a larger positioning frame by any means not shown in any suitable manner. A pair of gauging magnets 2 and 3, oppositely disposed on each side of the material to be gauged 4, are provided. A yoke 5 for attaching the two poles 6 and 7 of magnet 2 and a yoke 8 for attaching the two poles 9 and 10 of magnet 3 are provided. Insulators 11 are provided for each of the magnets to prevent the short circuiting of the lines of flux through the yoke. An inductance coil 12 around the core 13 is associated with magnet 2, and an inductance coil 14 associated with core 15 is provided for magnet 3. These coils are connected to a source of alternating current and also to a current responsive means, as will be described later in connection with Fig. 2. Within the scope of my invention, means may be provided for adjusting the distance between the poles the two opposed electro-magnets. While any means within the scope of my invention may be used, I provide a shaft 16 attached to the yoke 5 of magnet 2 which extends through the frame 1, and the up-and-down movement of the magnet 2 is adjusted by means of the adjusting nut 17 threaded to the pole 16 and bearing on the upper frame as shown. A spring 18 is provided between the frame 1 and the yoke 5 to provide sufficient tension for firmly holding the magnet in proper position for gauging.

The material to be gauged 4 is positioned in the device or passed through the air gap by means of fixed rollers 19 journaled to the frame, as shown, and movable rollers 20 journaled in the U-shaped elements 21. Shafts 22 are fixedly attached to the elements 21 and are journaled in the upper portion of the frame 1 as indicated. Springs 23 provide suitable tension for firmly holding the material to be gauged 4 in place.

Figure 2:
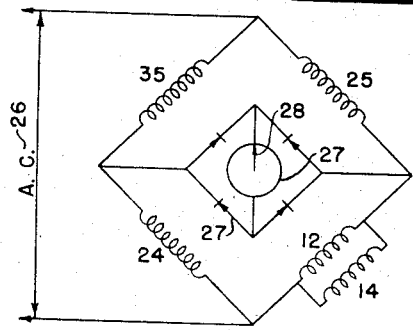
Fig. 2 shows an impedance bridge circuit having the inductance coils associated with the gauging magnets positioned in parallel in one arm of the bridge. It also illustrates a current responsive means for determining the magnitude of the flux.

Fig. 2 shows my novel means of interpreting the results of the gauging operation. An impedance bridge circuit employing a suitable current responsive means is provided for determining the variation in the flux. The impedance bridge circuit contains reactance coils 12 and 14 connected in parallel in one arm of the bridge which are the reactance or inductance coils described in Fig. 1, as being associated with electromagnets 2 and 3, respectively. Coil 35 is positioned in the diagonally disposed arm of the bridge in order to balance the bridge circuit. Reactance coils 24 and 25 are provided for balancing the bridge circuit. The bridge circuit is connected to a source of alternating current shown at 26. A connection is made across the bridge circuit including a copper oxide rectifier 27 which is a well-known type of rectifying means to change the alternating current into direct current, although other types of suitable rectifiers may be used. A current responsive means such as the milliammeter 27' is provided to measure the current flowing across the bridge circuit when the bridge is unbalanced. When the bridge is in balance, no current will flow across the bridge and the needle 28 is at the zero point as indicated and any change in flux created by the electromagnets will cause an unbalance in the arms of the bridge in which are connected the inductance coils 12 and 14, and the needle will be deflected and will indicate the extent of such change in flux, thus providing a means for indicating the thickness of the material.

Furthermore, by arranging the two coils in parallel in one arm of the bridge as described herein, with any given thickness of material to be gauged disposed between the poles of the opposing coils, any decrease in the magnetic flux in one coil is automatically compensated for by a corresponding increase in the opposing coil, so that the total flux applied to this arm of the bridge remains constant regardless of the location of the material being gauged in the space between the poles. Thus it is not necessary to keep the material being gauged centered between the poles of the opposing magnetic gauging heads and the reading obtained is not affected by vibrations of the machinery with which the equipment is used and by flutter of the sheet being gauged.

This bridge is particularly adaptable for measurements wherein a constant air gap is maintained independent of the thickness of the standard of comparison. It has the advantage that any vibrations in the device for positioning the material during gauging does not affect the results appreciable, since by arranging coils 12 and 14 in parallel in one arm of the bridge such changes in flux due to the vibrations off-set each other and thereby the amount of current indicated by the milliammeter 27' is not affected except by the change in the thickness of the material.

A typical operation of the device described and illustrated for Figs. 1 and 2 is as follows: If it is desired to measure materials less than ½ inch thick, the distance between the poles of the magnets 2 and 3, without any material to be gauged disposed therebetween, is adjusted by means of the adjusting nut 17 until an air gap of ½ inch is obtained. The needle 28 of the instrument 27' is then set at the zero point. Assuming it is desired to compare the thickness of the material gauged against a standard of thickness comparison equal to ¼ inch, such standard of thickness comparison is placed in the air gap as shown in Fig. 1 by the numeral 4, and the magnet 2 by means of adjusting nut 17 is raised until the needle 28 again reaches the zero point which means that the same air gap it obtained for a standard of thickness comparison of ½ inch as for the previously determined air gap. The standard of thickness comparison is now removed from the device and the material is ready for gauging. The material to be gauged is now placed in the device and any variation of thickness from the standard of thickness comparison causes a change of flux differing from the flux resulting when the standard of thickness comparison was in the device, and variations in flux will be indicated in milliamperes by the needle 28 of the instrument 27'. By always obtaining the same air gap for each standard of thickness comparison, it is obvious that the same sensitivity is always obtained and it also provides a simple way of obtaining the zero point from which all measurements are made.

A typical operation using the apparatus shown in Figs. 1 and 2 is as follows:

A standard of thickness comparison is placed in position in the apparatus of Fig. 1 and the gauging magnet 2 is adjusted until the zero point of milliammeter 27' is obtained. The standard of thickness comparison is now removed and the material to be gauged is placed in the apparatus and any variation in thickness from the standard of thickness comparison will be reflected in milliamperes by the instrument 27'.

Figure 3:
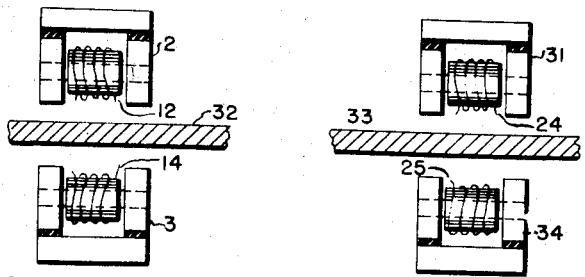
Fig. 3 is a simplified illustrative drawing showing the use of a standard of thickness comparison gauging magnet for obtaining a comparison with the material to be gauged in the gauging magnets.

In Fig. 3, 29 shows the thickness gauging device of Fig. 1 using magnets 2 and 3 in simplified form. It is understood that suitable means similar to that shown in Fig. 1 must be used to provide a complete workable apparatus. Likewise, 30 indicates an identical apparatus which is used as a standard of thickness comparison device. In this case, the coils 12 and 14 are embodied in the impedance bridge as shown. The coils 24 and 25 in device 30 are inductively associated with the magnets 31 and 34, respectively. Suitable adjusting means are provided for each of the gauging devices 29 and 30 similar to the adjusting means shown in Fig. 1 for varying the width of the air gap.

A typical operation of Figs. 2 and 3 is as follows: A standard of thickness comparison 32 is placed in the gauging device 29 and another standard of thickness comparison 33 of same thickness as 32 is placed in device 30. The air gap of each of the devices 29 and 30 is adjusted until the needle 28 of the instrument 27' is at the zero point. The standard of thickness comparison 32 in the gauging device 29 is now removed and the entire device is ready for gauging. The material to be gauged is now placed in the air gap in the device 29 between the magnets 2 and 3 and variations in thickness due to a decrease in the width of the air gap results in a variation in flux compared with the flux resulting from the standard of thickness comparison device 30 and such variations cause a change in the milliampere reading as indicated by the needle 28 of the instrument 27'.

Other means for accomplishing the results of my invention may be used but the above typical examples are illustrative of the broad principles of my invention. My invention is not limited by the apparatus or examples given but is only limited by the following claims:

I claim:

1. In a device for gauging the thickness of magnetic material employing a pair of opposed electromagnets between the poles of which the material to be gauged is disposed and wherein said thickness is determined by the use of a bridge circuit which measures deviations from a predetermined value in the magnetic flux generated by said opposing electromagnets as a result of variations in the thickness of said material, the improvement which comprises connecting the coils of said opposing electromagnets in parallel in one arm of said bridge circuit, whereby said deviation in flux results only from changes in the total air gap between both electromagnets and the material being gauged and is not altered by a change in the air gap between one of said magnets and said material when a corresponding change, in the opposite direction, occurs in the air gap between the opposing electromagnets and said material.

2. A device for gauging the thickness of magnetic material comprising a pair of opposed electromagnets having coils inductively connected with the poles of said magnets, means for positioning the material to be gauged between the poles of said magnets, a bridge circuit for determining variations in the thickness of the material gauged by measuring the variation from a predetermined value of the flux generated between the poles of the magnet, the coils of said opposing electromagnets being connected in parallel in one arm of said bridge circuit, induction coils positioned in the other arms of said bridge for balancing the circuit when a material of standard thickness is being gauged, and means connected across the bridge for determining the flux generated.

3. A device for gauging the thickness of magnetic material comprising a pair of opposed electromagnets having coils inductively connected with the poles of said magnets, means for positioning the material to be gauged between the poles of said magnets, a bridge circuit for determining variations in the thickness of the material gauged by measuring the variation from a predetermined value of the flux generated between the poles of the magnets, the coils of said opposing electromagnets connected in parallel in one arm of said bridge circuit, a second pair of opposed electromagnets having coils inductively connected with their poles, means for positioning between the last named poles a magnetic material of standard thickness, the coils of said second pair of magnets being separately disposed in the diagonally opposed arms of the bridge adjacent to the arm in which the coils of the gauging magnet are positioned, an induction coil positioned in the fourth arm of the bridge for balancing the circuit when a material of standard thickness is being gauged, and means connected across the bridge for determining the flux generated.

CHARLES H. ANGELL.

No references cited.